United States Patent [19]
Lin

[11] Patent Number: 5,692,415
[45] Date of Patent: Dec. 2, 1997

[54] BICYCLE PEDAL HAVING TWO SURFACES FOR COUPLING TO A BICYCLE SHOE

[76] Inventor: Wen-Hwa Lin, No.816, Chan Shen Rd., Tiah Shen Tsun, Wei Pu Hsiang, Taichung Hsien, Taiwan

[21] Appl. No.: 625,418

[22] Filed: Mar. 29, 1996

[51] Int. Cl.$^6$ ....................................... B62M 3/08
[52] U.S. Cl. ........................................... 74/594.6
[58] Field of Search .................... 74/594.6, 594.4; 36/131

[56] References Cited

U.S. PATENT DOCUMENTS

| | | | |
|---|---|---|---|
| 5,003,841 | 4/1991 | Nagano | 74/594.4 |
| 5,195,397 | 3/1993 | Nagano | 74/594.4 |
| 5,259,270 | 11/1993 | Lin | 74/594.6 |
| 5,522,282 | 6/1996 | Nagano | 74/594.6 |

FOREIGN PATENT DOCUMENTS 516013  12/1992  European Pat. Off. .............. 74/594.6

*Primary Examiner*—Charles A. Marmor
*Assistant Examiner*—Mary Ann Battista
*Attorney, Agent, or Firm*—Varndell Legal Group

[57] ABSTRACT

A bicycle pedal which includes a pedal base, two fixed locating plates fixedly and reversely secured to the pedal base, two movable locating plates turned about respective locating bolts on the pedal base to act against the fixed locating plate for the coupling of the sole of a bicycle shoe, two stop plates moved in respective sliding slots on the pedal base, two springs respectively turned about the locating bolts and abutted against the stop plates and hung on the movable locating plates to force the movable locating plates toward the fixed locating plates, two socket head screws respectively threaded into respective countersunk screw holes on the pedal base and respective screw holes on the stop plates and turned to move the stop plates relative to the springs in adjusting the spring force of the springs.

1 Claim, 4 Drawing Sheets

BICYCLE PEDAL HAVING TWO SURFACES FOR COUPLING TO A BICYCLE SHOE

BACKGROUND AND SUMMARY OF THE INVENTION

The present invention relates to bicycle pedals, and relates more specifically to such a bicycle pedal designed for the coupling of the sole of a bicycle shoe.

FIG. 1 shows a prior art bicycle pedal designed for the coupling of the sole of a bicycle shoe. This structure of bicycle pedal comprises two fixed locating plates and two movable locating plates for the coupling of the sole of a bicycle shoe. The movable locating plates are respectively forced toward the fixed locating plates by springs. The spring force of each spring is controlled by a respective stop plate and a respective screw bolt. This structure of bicycle pedal is complicated, and needs much installation space. When adjusting the spring force, the stop plate tends to fall out of place, causing the springs unable to be forced into place.

The present invention has been accomplished to provide a bicycle pedal which eliminates the aforesaid drawbacks. It is one object of the present invention to provide a bicycle pedal which is easy to assemble. It is another object of the present invention to provide a bicycle pedal which needs less installation space.

DETAILED DESCRIPTION OF THE PREFERRED EMBODIMENT

Figure 1:
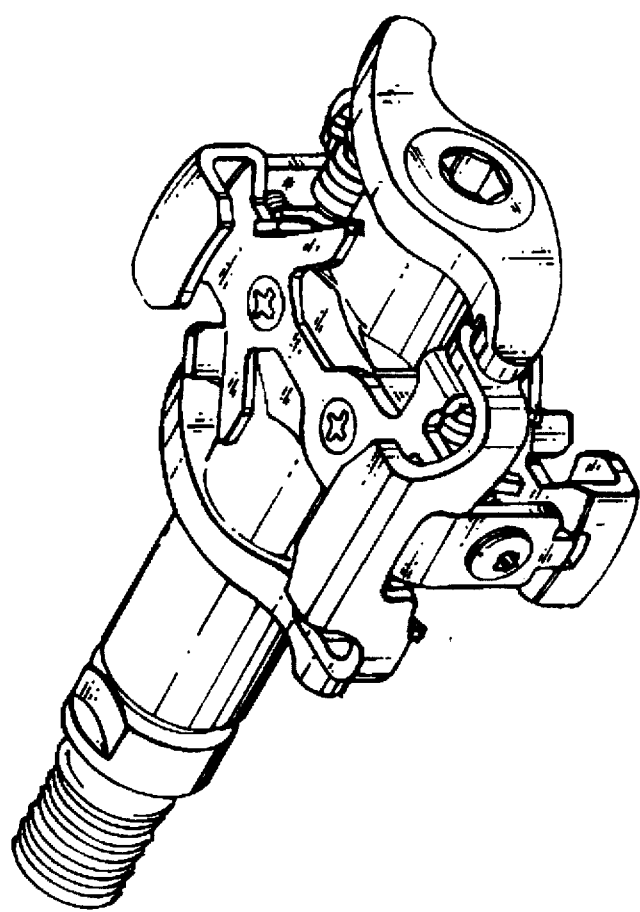
FIG. 1 is an elevational view of a bicycle pedal according to the prior art.
Figure 2:
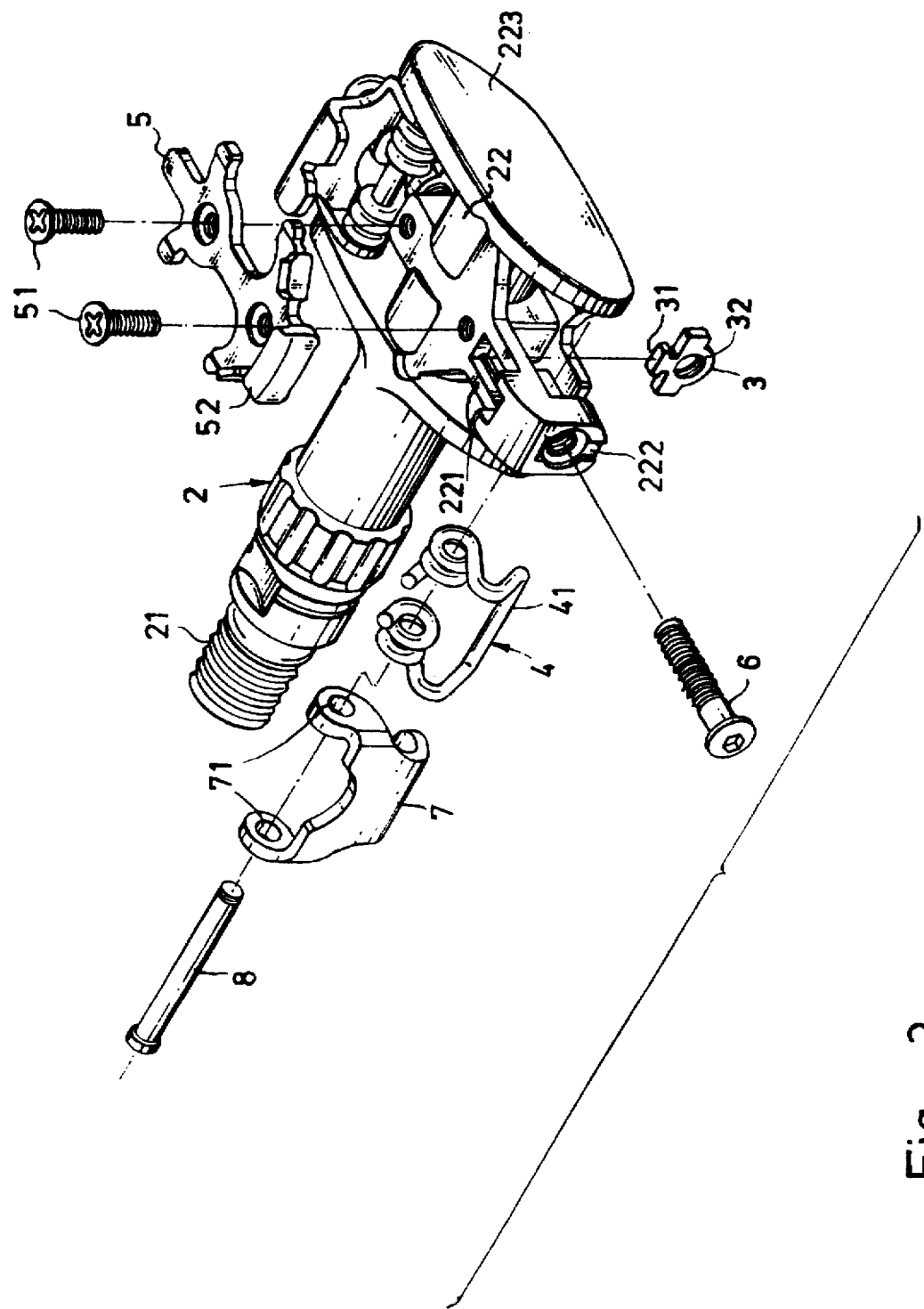
FIG. 2 is an exploded view of a bicycle pedal according to the present invention.
Figure 3:
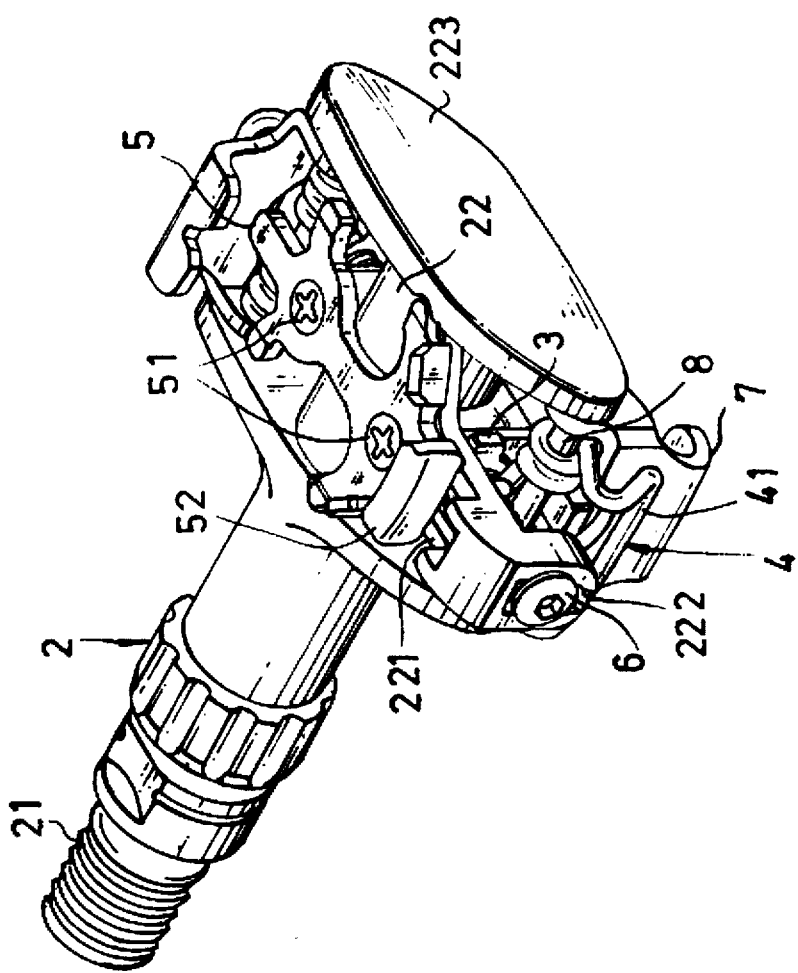
FIG. 3 is an elevational view of the bicycle pedal shown in FIG. 2.
Figure 4:
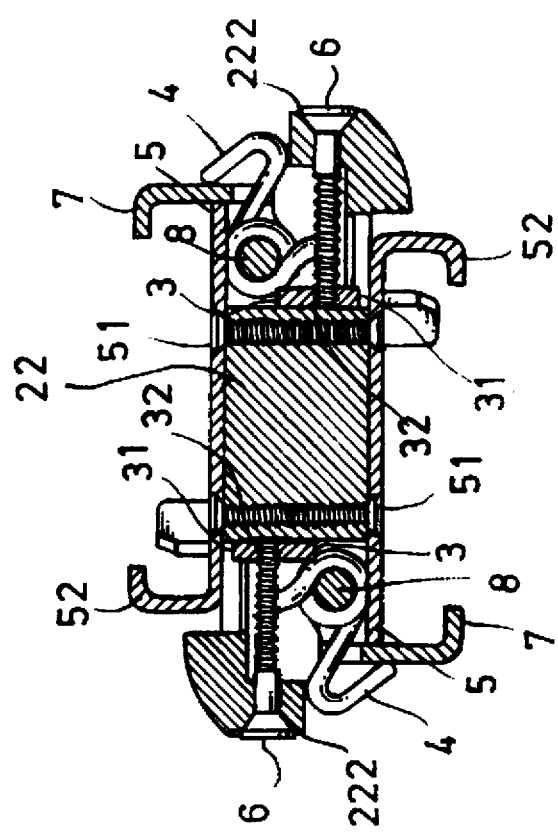
FIG. 4 is a cross-sectional view of FIG. 3.

Referring to FIGS. 2, 3, and 4, a bicycle pedal in accordance with the present invention is generally comprised of a pedal base 2, two stop plates 3, and two springs 4. The stop plates 3 and the springs 4 are symmetrically fastened to the pedal base 2 in reversed directions.

The pedal base 2 comprises an outer thread 21 at one end for mounting, and a coupling block 22 at an opposite end. Two fixed locating plates 5 are fastened to two opposite sides of the coupling block 22 by countersunk screws 51. Each of the fixed locating plates 5 has a coupling flange 52 at one end. The coupling block 22 has two sliding slots 221 near two opposite ends, and two horizontal countersunk screw holes 222 at two opposite ends. The stop plates 3 are respectively and reversely mounted within the sliding slots 221 of the locating block 22 of the pedal base 2, each having a top projecting portion 31 moved in one sliding slot 221, and a screw hole 32 in alignment with one countersunk screw hole 222 of the coupling block 22 of the pedal base 2. Two socket head screws 6 are respectively threaded into the countersunk screw holes 222 of the coupling block 22 of the pedal base 2 and the screw holes 32 of the stop plates 3. The springs 4 are respectively mounted within two movable locating plates 7 and coupled to two opposite ends of the coupling block 22 of the pedal base 2 in reversed directions by two locating bolts 8. Each of the movable locating plates 7 has two eyed lugs 71 bridging over one sliding slot 221 of the coupling block 22 of the pedal base. The locating bolts 8 are respectively inserted through the eyed lugs 71 of the movable locating plates 7 and coiled opposite ends of springs 4, and then fixed to the transverse end wall 223 of the coupling block 22 of the pedal base 2. Each of the springs 4 has a middle retaining portion 41 hung on one movable locating plate 7 to force it toward the coupling flange 52 of the corresponding fixed locating plate 5. When assembled, the springs 4 are respectively abutted against the stop plates 3. By turning the socket head screws 6 to move the stop plates 3 inwards or outwards, the spring force of each spring 4 is relatively adjusted.

I claim:

1. A bicycle pedal comprising a pedal base having a coupling block at one end, two fixed locating plates secured to said coupling block at two opposite sides thereof in reversed directions, said fixed locating plates fixed in place relative to said coupling block, each said fixed locating plate having a coupling flange at one end, two movable locating plates respectively fastened to said coupling block at said two opposite sides in reversed directions and turned about a respective locating bolt on said coupling block, two stop plates respectively mounted in said coupling block at two opposite locations in reversed directions, and two springs reversely mounted in said coupling block and respectively abutted against said stop plates for forcing said movable locating plates toward said coupling flanges of said fixed locating plates, wherein:

said coupling block of said pedal base comprises two stepped sliding slots near two opposite ends, two horizontal countersunk screw holes at said two opposite ends, and two socket head screws respectively threaded into said countersunk screw holes, said stop plates have a respective top projecting portion with a T-shape matching a shape of said two stepped sliding slots and a respective screw hole threaded onto one of said socket head screws, a stem of said T-shape received in one of said stepped sliding slots, said stop plates are respectively moved by said socket head screws along said sliding slots to adjust spring force of said springs when said socket head screws are turned; said stop plates, said two stepped sliding slots, and said two horizontal countersunk screw holes are arranged so that said two socket head screws are exposed and accessible for adjustment of said spring force when said bicycle pedal is in use, and said springs are respectively mounted within said movable locating plates and abut said stop plates, each said spring having two coiled ends respectively mounted around said respective locating bolt and a middle retaining portion pressing on a back of one of said movable locating plates for forcing said movable locating plate toward said coupling flange of a corresponding said fixed locating plate.

* * * * *